Oct. 19, 1954  F. A. PAYNE, JR  2,692,097
RETRACTABLE AIRCRAFT LANDING GEAR
Filed Dec. 22, 1951
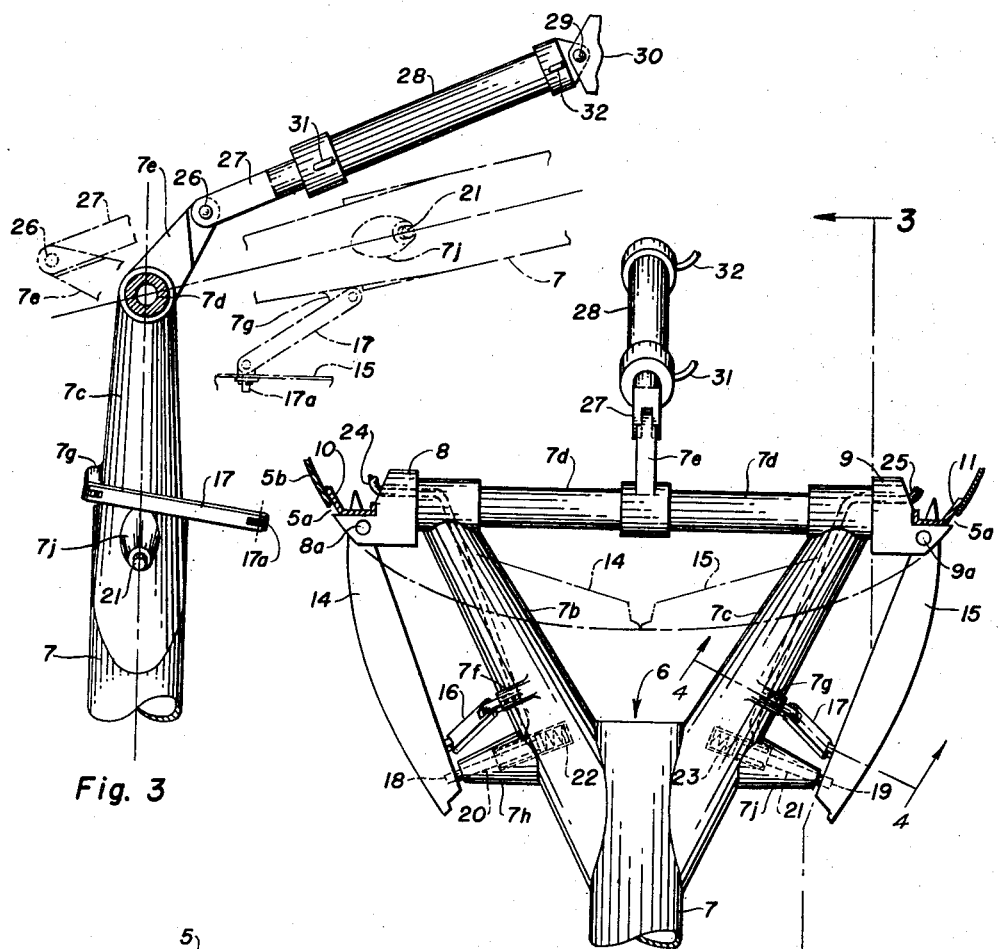
Fig. 3
Fig. 2
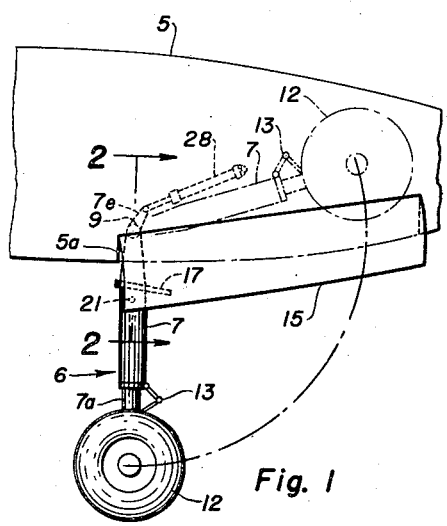
Fig. 1
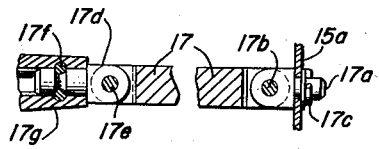
Fig. 4
Fred A. Payne, Jr.
INVENTOR.
BY
HIS PATENT ATTORNEY.

Patented Oct. 19, 1954

2,692,097

UNITED STATES PATENT OFFICE 2,692,097

RETRACTABLE AIRCRAFT LANDING GEAR

Fred A. Payne, Jr., Playa del Rey, Calif., assignor to North American Aviation, Inc.

Application December 22, 1951, Serial No. 262,935

8 Claims. (Cl. 244—102)

1

The present invention relates generally to landing gears for aircraft and other vehicles and more particularly to improved arrangements for fairing and supporting the landing gear in its retracted and extended positions.

This invention is directed essentially to an improved retractable landing gear and fairing closure or door arrangement of extreme simplicity and compactness which provides for greater utilization of the space within the retraction well in the aircraft body for the use of other equipment. It has previously been known to attach fairing plates and so-called "tin-pants" to landing gear struts in efforts to reduce the resistance of the retracted strut, but a more complete and aerodynamically cleaner result is obtained by applicant's dual purpose closure and strut. A feature of the present retractable landing gear and fairing installation is its provision of fairing doors which automatically serve both to fair and streamline the landing gear in its retracted position as well as to serve as structural drag bracing for the landing gear in its extended position. This arrangement provides for a relatively great saving in weight due to the two independent functions of the fairing door. The present invention is also directed to a retractable landing gear of the cantilever strut type which may utilize a body or nacelle of monocoque or stressed-skin construction and which allows more internal space for other equipment within the body in the vicinity of the landing gear.

It is, accordingly, a major object of the present invention to provide an improved retractable landing gear of extreme compactness and simplicity in construction, light in weight and foolproof in its operation. It is a further object to provide a retractable landing gear and fairing door arrangement in which the doors fair the landing gear well in the retracted position and serve to brace the extended landing gear in the operative position against longitudinal or drag forces. A still further object relates to the corollary objective of providing fairing doors which serve two independent functions and thereby provide a relatively great saving in space requirements and weight. It is a still further object of this invention to provide a retractable landing gear arrangement which may utilize a nacelle of monocoque construction and which allows considerably more internal space in the vicinity of the landing gear. A further objective lies in a unique interlinkage between the landing gear strut and the fairing means whereby the latter is positioned and automatically locked

2 or latched to the strut for bracing the same in its operative position.

Other objects and advantages of the present invention will occur to those skilled in the art after reading the following description taken in conjunction with the accompanying drawings, forming a part hereof, in which:

Fig. 1 is a fragmentary side elevational view of a body or nacelle to which the improved retractable landing gear and fairing means has been applied;

Fig. 2 is an enlarged sectional view looking rearwardly, as indicated by the lines 2—2 of Fig. 1, showing the upper portion of the landing gear assembly and the fairing doors;

Fig. 3 is a side elevational view as taken along the lines 3—3 of Fig. 2 showing the upper portion of the landing gear in both its extended and retracted positions; and Fig. 4 is a detail view of the universally connected link between the landing gear and the fairing door as taken along the lines 4—4 of Fig. 2.

Referring now to Fig. 1, the numeral 5 designates a portion of an aircraft body to which the landing gear assembly 6 is attached, as indicated in the full lines in this figure, and within which body the assembly is arranged to be housed when retracted, as indicated by the construction lines. The skin or covering 5b, which may be stressed for monocoque construction, is interrupted at the edges 5a to define an opening through which the landing gear may be retracted. The landing gear assembly 6 may preferably be of the cantilever type and is comprised essentially of a shock absorbing cylinder portion 7 within which is resiliently reciprocable the wheel-carrying piston portion 7a. It will be understood that the aircraft body may be a fuselage or nacelle, or other component of the aircraft.

The support of the landing gear assembly 6 is shown in greater detail in Figs. 2 and 3, wherein it will be noted that the main cylinder or strut portion 7 is provided at its upper or inboard extremity with integral diverging Y or yoke portions 7b and 7c. The upper terminals of the diverging arms 7b and 7c are provided with transversely apertured socket portions which fixedly engage the transverse pivot shaft 7d. At the mid-portion of the transverse shaft 7d there is fixedly attached an upwardly extending crank arm fitting 7e by means of which the landing gear is extended and retracted, as more particularly described below. The yoke portion 7b of the landing gear strut cylinder 7 is provided with a lug 7f for a pivotal connection, and the yoke portion 7b is also provided with a further downwardly and laterally extending lug 7h arranged to serve as a pin or bolt guide. The corresponding arm portion 7c is also provided with lugs 7g and 7j for similar purposes which will be more fully described below.

At the outer lateral terminals of the diverging arms 7b and 7c, at which they are fixed to the ends of the transverse shaft 7d, the latter is journalled within the bearing fittings 8 and 9. These fittings are fixedly attached to the longitudinal nacelle frame members 10 and 11 along the opposed lateral edges 5a of the opening within the skin 5b of the nacelle. The lower extremity of the landing gear assembly 6 is preferably provided with suitable ground-engaging means, such as a wheel or the pair of dual wheels 12, which may be maintained in their normal forward alignment by means of the anti-torque scissors 13. At each lateral edge 5a of the opening in the nacelle, the fairing doors 14 and 15 are preferably pivotally mounted on longitudinal axes as at 8a and 9a. Inasmuch as these axes of the door hinge pivots extend longitudinally, the doors swing laterally downwardly and outwardly to open, while the landing gear assembly 6, being pivoted upon the transverse axis of the pivot shaft 7d, swings downwardly and forwardly to its operative position.

A conjoint action between the doors 14 and 15 and the landing gear assembly 6 during their extension and retraction movements is provided by the pivotally connected link 16 between the lug 7f of the strut arm 7b and the door 14 on the one hand and the corresponding pivotally interconnected link 17 between the lug 7g of the landing gear arm 7c and the pivotal connecting elements 17a and 17d (see Figs. 3 and 4) to the door 15. Both connections at the ends of the link 17 are preferably of the double pivoted or universal type, as more particularly shown in Fig. 4. The pivotal connecting terminal element 17a is pivotally connected by the pivot 17b to the link 17 and is rotatably retained within the opening in the door inner panel 15a by the retaining ring or cotter pin 17c. At the opposite end the similar pivotal connecting terminal element 17d is pivotally connected to the link 17 by the pivot 17e and is rotatably mounted and retained within the hole in the strut lug 7g by the retaining pin 17f. The links 16 and 17 are therefore in effect fixed length links or ties which are capable of transmitting tension and therefore prevent separation of the doors and the main strut beyond the distances dictated by these fixed length ties. The door 14 preferably has a plane inner face portion which is provided with a hole 18, which in the extended or open position of the door and the fully extended position of the landing gear strut 7, is engaged by a spring-pressed bolt or pin 20 reciprocably supported within the guide lug 7h of the arm portion 7b and urged into its extended position by the compression spring 22. A fluid pressure hose 24, which may alternatively comprise an actuating cable, is accessible to the pilot or other operator and extends through the bearing fitting 8 and the tubular portion of the arm 7b and the lug 7h to the bolt 20 for retracting the same when it is desired to permit unlocking or relative movement between the strut 7 and the door 14. The bolt 20 may have an integral piston portion urged by the spring 22 toward the outer end of a cylinder within the lug 7h. Similarly the door 15 is provided with a recess or hole 19 which is engageable by the spring-pressed bolt 21 reciprocable within the lug 7j under the influence of the spring 23 and similarly retractable for unlocking through the fluid hose 25.

The mechanism for the retraction of the landing gear comprises essentially a fluid-actuated motor consisting of the piston element 27 reciprocable within the cylinder 28, the piston being pivotally connected at 26 to the above-mentioned crank arm 7e fixedly attached to the transverse tubular shaft 7d. The cylinder 28 of the fluid actuator is pivotally mounted at 29 upon suitable aircraft supporting structure 30 and conventional fluid conduits 31 and 32 are provided for the controlled extension or retraction of the piston element 27. Suitable well known sequence mechanism can be provided to impart unlatching of the bolts 20 and 21 at a predetermined interval prior to the admission of high pressure fluid through the conduit 32 to the cylinder 28 whereby the unlatching and retraction of the landing gear assembly can be accomplished by the movement of a single control on the part of the operator.

The operation of the improved retractable landing gear and fairing door arrangement is as follows: With the landing gear assembly 6 in its extended operative position as shown in Fig. 1, in which the fairing doors 14 and 15 are also in their extended or opened positions and are locked to the main strut 7 by means of the bolts 20 and 21, the landing gear assembly 6 is braced in the longitudinal, or fore and aft direction, by the fairing doors 14 and 15. The latter are prevented from movement laterally about their hinge axes 8a and 9a by the links 16 and 17 which hold the doors firmly in their latched positions. The doors 14 and 15, accordingly, are utilized to good advantage in the extended position of the landing gear by providing adequate bracing of the single cantilevered strut 7 to the nacelle structure thereby eliminating the necessity for additional drag struts and also making the space available within the nacelle which would otherwise be occupied by such additional drag bracing structure. In order to retract the landing gear assembly 6 and to concurrently close the fairing doors 14 and 15, the bolts 20 and 21 are retracted against the opposition of the springs 22 and 23 by suitable fluid pressure being exerted through the actuating hoses 24 and 25. Following the retraction of the bolts 20 and 21 and the unlatching of the previously fixed relationship between the door 14 and the arm 7b on the one hand, and the door 15 and the arm 7c on the other hand, fluid pressure is exerted within the conduit 32 for the forward extension of the piston 27 causing counterclockwise rotation of the crank arm 7e and the strut 7 about its pivotal mounting 7d as viewed in Fig. 3. As the landing gear assembly 6 is caused to be rotated rearwardly and upwardly, the links 16 and 17 draw the fairing doors 14 and 15, respectively, until they reach their retracted streamlined positions as shown in the construction lines in Fig. 2.

It will be obvious that the extension of the landing gear is accomplished in a similar manner by a reversal of the above described operations. Accordingly, with the landing gear and the doors in their retracted positions, in which suitable conventional up-latches (not shown) may be provided for these components, the extension of the landing gear is accomplished by the unlocking of the up-latches and the release of the fluid pressure within the cylinder 28 against the piston 27 to permit the landing gear to fall by gravity or to be otherwise forced downwardly and forwardly into its extended position. As the landing gear strut moves downwardly and forwardly, the links 16 and 17 initially push the fairing doors 14 and 15, respectively, before the strut, and simultaneously as the doors reach predetermined positions which are defined by their respective hinges and the links 16 and 17, the spring-pressed bolts 20 and 21 become aligned with the recesses 18 and 19 at the outer extremities of the forward portions of the respective doors, and the doors become fixedly latched to the landing gear strut 7 in which condition they provide the necessary drag bracing to prevent folding of the landing gear, or rotation rearwardly and longitudinally about its transverse axis of pivotation.

It will be obvious to those skilled in this art that a preferred embodiment has been illustrated and described for purposes of explanation only, and that in certain installations the strut upper portion may be plain instead of the divergent Y-shape; and also that the invention is equally applicable to a single fairing door, instead of the double doors shown.

Other forms and modifications of the present retractable landing gear and fairing door arrangement which may become obvious to those skilled in the art after reading the foregoing description, are intended to come within the scope and spirit of this invention as more particularly set forth in the appended claims.

I claim:

1. In an airplane having an opening therein, a landing gear movably mounted upon the airplane, means for retracting said landing gear through said opening into said airplane, fairing means movably supported from said airplane for fairing said opening in the retracting position of said landing gear, and means including a fixed length link universally connecting said fairing means with said landing gear and spring-biased extension bolt detent means cooperatively interconnected between said fairing means and said landing gear arranged in such manner that as said landing gear is moved into its extended position said fairing means is concurrently moved into an open position in which said fairing means serves to retain said landing gear in its extended position.

2. In an airplane having an opening therein, a landing gear pivotally mounted upon the airplane upon a transverse axis, power means for retracting said landing gear through said opening into said airplane, closure means hingedly supported from said airplane upon a longitudinally extending axis for fairing said opening in the retracted position of said landing gear, link means connecting said fairing means with said landing gear arranged in such manner that as said landing gear is moved into its extended position said closure means is concurrently moved into a predetermined open position and laterally extending latch means carried by said landing gear and engageable with said fairing means in said open position at which said closure means is automatically latched to said landing gear.

3. In an airplane having an opening therein, a landing gear pivotally mounted upon the airplane upon a transverse axis, means for retracting said landing gear through said opening into said airplane, fairing means movably supported from said airplane upon a longitudinally extending axis for fairing said opening in the retracted position of said landing gear, means including links universally connecting said fairing means with said landing gear and automatic latching means including laterally extending bolts carried by said landing gear arranged in such manner that as said landing gear is moved into its extended position about said transverse axis said fairing means is concurrently moved about said longitudinally extending axis into an open position at which said fairing means is latched to said landing gear for bracing the same against drag forces in its extended position.

4. In an airplane having an opening therein, a landing gear strut movably mounted upon the airplane, means for retracting said landing gear strut through said opening into said airplane, fairing means hingedly supported from said airplane for fairing said opening in the retracted position of said landing gear strut, link means pivotally connecting said fairing means with said landing gear strut, a recess formed within said fairing means, and latching means cooperatively carried by said strut and said fairing means arranged in such manner that as said landing gear is moved into its extended position said fairing means is concurrently moved by said link means into an open position at which said fairing means is latched to said strut by engagement of said latching means with said recess and said fairing means serves to brace said landing gear strut in its extended position against drag forces.

5. An airplane body having an opening, a landing gear strut pivotally mounted upon a fixed transverse axis upon the airplane body for retraction and extension through said opening, fairing means pivotally mounted upon a longitudinally extending axis upon an edge of said opening, universal link means pivotally interconnecting said fairing means with said strut for imparting opening movement to said fairing means upon extension of said strut and closing movement of said fairing means upon retraction of said strut, and automatic means including a laterally extensible bolt for latching said strut to said fairing means in the extended operative position of said strut.

6. An airplane body having an opening through a lower wall thereof, a landing gear strut pivotally mounted upon a transverse axis for retraction and extension through said opening in the longitudinal direction, fairing means pivotally mounted upon an edge of said opening upon a longitudinal axis, means including a link universally interconnecting said fairing means with said strut for imparting opening movement to said fairing means upon extension of said strut and for imparting closing movement of said fairing means upon retraction of said strut, and automatic means including a spring-pressed bolt for latching said strut to said fairing means in the extended operative position of said strut.

7. An airplane body having an opening through a lower wall thereof, a landing gear strut pivotally mounted upon a transverse axis for retraction and extension through said opening in the longitudinal direction, fairing means pivotally mounted upon the opposed lateral edges of said opening upon longitudinal axes, universal link means pivotally interconnecting each said fairing means with said strut for imparting opening movements to said fairing means upon extension of said strut and for imparting closing movements of said fairing means upon retraction of said strut and automatic means including laterally extensible bolts for latching said strut to said fairing means in the extended operative position of said strut wherein said fairing means serves to longitudinally brace said strut to said airplane body.

8. An airplane body having an opening through a lower wall thereof, a landing gear strut pivotally mounted upon a transverse axis for retraction and extension through said opening in the longitudinal direction, fairing means including a pair of closures for said opening pivotally mounted upon longitudinal axes upon the opposed lateral edges of said opening, means including fixed length elements universally interconnecting each said fairing means with said strut for imparting opening movements to said fairing means upon extension of said strut and for imparting closing movements of said fairing means upon retraction of said strut, and automatic means including a spring-pressed bolt and a detent cooperatively carried by said strut and said fairing means for latching said strut to said fairing means in the extended operative position of said strut.

References Cited in the file of this patent

UNITED STATES PATENTS

| Number | Name | Date |
|---|---|---|
| 1,956,313 | Capelis | Apr. 24, 1934 |
| 2,454,658 | Leitch | Nov. 23, 1948 |